(12) United States Patent
Takemoto et al.

(10) Patent No.: US 7,768,692 B2
(45) Date of Patent: Aug. 3, 2010

(54) SINGLE-PHOTON GENERATOR

(75) Inventors: Kazuya Takemoto, Kawasaki (JP);
Tatsuya Usuki, Kanagawa (JP);
Yasuhiko Arakawa, Kanagawa (JP)

(73) Assignees: Fujitsu Limited, Kawasaki (JP); The University of Tokyo, Tokyo (JP)

( * ) Notice: Subject to any disclaimer, the term of this patent is extended or adjusted under 35 U.S.C. 154(b) by 910 days.

(21) Appl. No.: 11/633,537

(22) Filed: Dec. 5, 2006

(65) Prior Publication Data

US 2007/0228373 A1  Oct. 4, 2007

(30) Foreign Application Priority Data

Mar. 30, 2006  (JP) ............... 2006-094544

(51) Int. Cl.
*G02F 1/1335* (2006.01)
*H04L 9/08* (2006.01)

(52) U.S. Cl. ............. 359/326; 359/330; 380/256; 380/278; 380/283; 380/46

(58) Field of Classification Search ......... 359/326–330; 380/256, 278, 283, 46; 398/154
See application file for complete search history.

(56) References Cited

U.S. PATENT DOCUMENTS

2006/0274401 A1* 12/2006 Inoue .................. 359/326
2007/0098174 A1* 5/2007 Trifonov et al. ......... 380/256
2009/0034737 A1* 2/2009 Trifonov .............. 380/278

FOREIGN PATENT DOCUMENTS

| JP | 2000-216775 | 8/2000 |
| JP | 2003-249928 | 9/2003 |

OTHER PUBLICATIONS

C. Gobby, et al.; "Quantum key distribution over 122 km of standard telecom fiber;" *Applied Physics Letters*; vol. 84; No. 19; May 10, 2004; pp. 3762-3764.
B. Lounis, et al.; "Single photons on demand from a single molecule at room temperature;" *Nature*; vol. 407; Sep. 28, 2000; pp. 491-493.
C. Kurtsiefer, et al.; "Stable Solid-Sate Source of Single Photons;" *Physical Review Letters*; vol. 85; No. 2; Jul. 10, 2000; pp. 290-293.
T. Miyazawa, et al.; "Single-Photon Generation in the 1.55-μm Optical-Fiber Band from an InAs/InP Quantum Dot;" *Japanese Journal of Applied Physics*; vol. 44; No. 20; May 2, 2005; pp. L620-L622.
X. Brokmann, et al.; "Highly efficient triggered emission of single photons by colloidal CdSe/ZnS nanocrystals;" *Applied Physics Letters*; vol. 85; No. 5; Aug. 2, 2004; pp. 712-714.

* cited by examiner

*Primary Examiner*—Hemang Sanghavi
(74) *Attorney, Agent, or Firm*—Kratz, Quintos & Hanson, LLP

(57) ABSTRACT

A single-photon generator includes a single-photon generating device generating a single-photon pulse having a wavelength on the shorter wavelength side than a communication wavelength band, and a single-photon wavelength conversion device performing wavelength conversion of the single-photon pulse into a single-photon pulse of the communication wavelength band, using pump pulse light for single-photon wavelength conversion.

12 Claims, 2 Drawing Sheets

SINGLE-PHOTON GENERATOR

BACKGROUND OF THE INVENTION (1) Field of the Invention

The present invention relates to a single-photon generator and a single-photon generation method for use in, for example, quantum cryptography and a quantum information processing field.

(2) Description of Related Art

Toward the realization of a next-generation information society including electronic government and electronic commerce, safe and secure cryptographic communication is inevitable.

At present, the public encryption key system and the secret encryption key system are used for cryptographic communication. In the RSA public encryption key system currently in wide use, security is guaranteed only by a calculation amount side that an enormous time is needed to solve a prime factorization of an extremely large number using a polynomial. Therefore, when a quantum computer having excellent capability of ultra high-speed parallel computation comes on the scene, the time required for decrypting such encrypted information will be drastically shortened, and the security will not be guaranteed any more. In other words, the security of the public encryption key system and the secret encryption key system currently in use is not absolutely perfect.

For example, in case of the public encryption key system, once a public key is decrypted, there is a risk of wiretapped or falsification of data by a third party. Also, in case of the secret encryption key system, an information sender and a receiver own an identical secret key, and data encrypted by the sender using the secret key is decrypted by the receiver using the identical secret key. In such the secret encryption key system, there is a risk that the exact secret key is wiretapped when the secret key is distributed to the two parties concerned.

The quantum cryptography is expected to be a means for solving such a security problem.

A well-known system in the quantum cryptography is the "BB84" protocol proposed by C. H. Bennett and G. Brassard in 1984.

In the above protocol, information is carried on each single-photon for transmission, not on an aggregate of photons as is conventionally used in the optical communication. If one information bit is given to one photon, for example, a polarized state of the photon, it is neither possible to extract nor to duplicate without destroying the photon state, because each photon follows the Heisenberg's uncertainty principle (a principle that conjugate physical quantities cannot be measured simultaneously with accuracy) and the no-cloning theorem (a theorem that no duplication can be made without observing a quantum state).

Accordingly, when duplication (wiretapping) or falsification is performed on a communication path by a third party, it is possible to detect immediately, and only a 'clean' key not observed by the third party can be shared by the sender and the receiver. Thus, the security of the encryption key shared by the two parties is guaranteed based on the physical principle, not on difficulty in respect of the computation amount, as long as the carrier of information is a single-photon.

In recent years, commercial use of a quantum cryptography system has been in progress.

In the quantum cryptography system, a sender side includes a single-photon source for generating one photon (single-photon) and a controller of a polarized state or a phase state for adding secret key information to the photon, while a receiver side includes a single-photon detector for detecting the photon information.

As the single-photon source, normally a laser light source and an attenuator are used. In such the single-photon source, a laser pulse stream is output from the laser light source, and the light intensity of the laser pulse stream is attenuated by the attenuator, so that a mean number of photons per pulse becomes one or less. Thus, a single-photon is generated in a simulated manner.

However, when generating the single-photon in such the simulated manner, the generation of a plurality of single-photons cannot completely be reduced to zero. When the plurality of single-photons are included in one pulse, a security problem occurs because wiretapping can be performed by stealing a portion thereof without being noticed by the receiver.

To suppress a generation ratio of the plurality of photons, it is an effective method to increase the attenuation rate of the laser light. However, the above method leads to the cost of a decreased key transmission rate.

Meanwhile, to extend a key transmission distance, it is also important to use a communication wavelength band (1.3-1.55 µm) producing less transmission loss in an optical fiber.

At present, quantum key distribution of 100 km or longer is reported by means of the BB84 protocol using a simulated single-photon of 1.55-µm band. (Refer to "Quantum key distribution over 122 km of standard telecom fiber", C. Gobby et al., Applied Physics Letters, Vol. 84 No. 19, p. 3762-3764, May 10, 2004.) However, a key distribution speed is 1 Hz or less for 122 km.

For the above reasons, in order to achieve high-speed, long-distance quantum key distribution, a true single-photon generator in a communication wavelength band becomes necessary.

As to such a true single-photon generator in a communication wavelength band, a lot of studies have been carried out so far.

As a well-known method, there has been a method for extracting a photon one-by-one by exciting a carrier in an isolated two-level system through optical pumping or current injection, and using an exclusive recombination process. For example, it is considered to use a single molecule (Refer to "Single photons on demand from a single molecule at room temperature", B. Lounis et al., Nature, Vol. 407, p. 491-493, Sep. 28, 2000), a nitrogen-vacancy color center in a diamond crystal (Refer to "Stable Solid-State Source of Single Photons" Christian Kurtsiefer et al., Physical Review Letters, Vol. 85, No. 2, p. 290-293, Jul. 10, 2000), a quantum dot [Refer to (1) "Single-Photon Generation in the 1.55-µm Optical-Fiber Band from an InAs/InP Quantum Dot", Toshiyuki Miyazawa et al., Japanese Journal of Applied Physics, Vol. 44, No. 20, L620-L622, 2005, and (2) "Highly efficient triggered emission of single photons by colloidal CdSe/ZnS nanocrystals", X. Brokmann et al., Applied Physics Letters, Vol. 85 No. 5, p. 712-714, Aug. 2, 2004], and so on. In particular, a quantum dot has a merit capable of varying a wavelength depending on a material or a size. For a typical quantum dot, since the recombination lifetime of an electron-hole pair is on the order of 1 ns, in principle, the rate of generation of single-photons can be increased to the order of GHz.

Recently, a single-photon generating device of a communication wavelength band using an InAs self-organized quantum dot on InP has been reported (Refer to the aforementioned paper "Single-Photon Generation in the 1.55-µm Optical-Fiber Band from an InAs/InP Quantum Dot"). Meanwhile, operation at room temperature is also reported in the devices using a single molecule (Refer to the aforementioned paper "Single photons on demand from a single molecule at room temperature"), a nitrogen-vacancy color center in a diamond crystal (Refer to the aforementioned paper "Stable Solid-State Source of Single Photons"), and a CdSe quantum dot (Refer to the aforementioned paper "Highly efficient triggered emission of single photons by colloidal CdSe/ZnS nanocrystals"). Also, in addition to the above papers, the Japanese Patent Laid-Open Nos. 2003-249928 and 2000-216775 have been obtained, as a result of the prior art survey.

However, in the above-mentioned devices using a single molecule (Refer to the aforementioned paper "Single photons on demand from a single molecule at room temperature"), a nitrogen-vacancy color center in a diamond crystal (Refer to the aforementioned paper "Stable Solid-State Source of Single Photons") and a CdSe quantum dot (Refer to the aforementioned paper "Highly efficient triggered emission of single photons by colloidal CdSe/ZnS nanocrystals"), a great loss is produced in an optical fiber because the wavelength region lies in short wavelengths (on the order of 500-600 nm), and therefore, it is difficult to use as a single-photon source for long-distance transmission.

Also, as to the above-mentioned single-photon generating device of the communication wavelength band using an InAs quantum dot (Refer to the aforementioned paper "Single-Photon Generation in the 1.55-μm Optical-Fiber Band from an InAs/InP Quantum Dot"), since it is necessary to maintain a specimen temperature on the order of 10k, a cooling agent such as liquid helium is required, which inevitably causes an overall apparatus to become large in size.

SUMMARY OF THE INVENTION

Aspect of the present invention can provide a single-photon generator and a single-photon generation method capable of generating a single-photon of a communication wavelength band without causing an overall apparatus to become large in size.

In accordance with one aspect of the present invention, a single-photon generator includes a single-photon generating device generating a single-photon pulse having a wavelength of a shorter wavelength side than the communication wavelength band; and a single-photon wavelength conversion device performing wavelength conversion of the single-photon pulse into a single-photon pulse of a communication wavelength band using pump pulse light for single-photon wavelength conversion.

Further, in accordance with another aspect of the present invention, a single photon generation method includes the generation of a single-photon pulse having a wavelength of a shorter wavelength side than the communication wavelength band; and performing wavelength conversion of the single-photon pulse into a single-photon pulse of the communication wavelength band, using pump pulse light for single-photon wavelength conversion.

Thus, according to the single-photon generator and the single-photon generation method in accordance with the above aspects of the present invention, there is a merit that a single-photon pulse of a communication wavelength band can be generated without causing an overall apparatus to become large in size.

Further, when reusing, in a single-photon wavelength converter, the residual component of a fundamental wave pulse light having not been converted in a single-photon generating device, it is sufficient to provide only one pulse light source. Therefore, there is a merit that the overall apparatus can be configured compactly with a reduced cost. Moreover, since it is sufficient to provide only one pulse light source, frequency synchronization between each pulse can be performed without an additional electric circuit. Also, because the temporal overlap of a single-photon pulse with fundamental wave pulse light is optimized by means of a pulse stretcher and an optical path length adjuster, the conversion efficiency in a single-photon wavelength converter becomes optimal.

DESCRIPTION OF THE PREFERRED EMBODIMENTS

Figure 1:
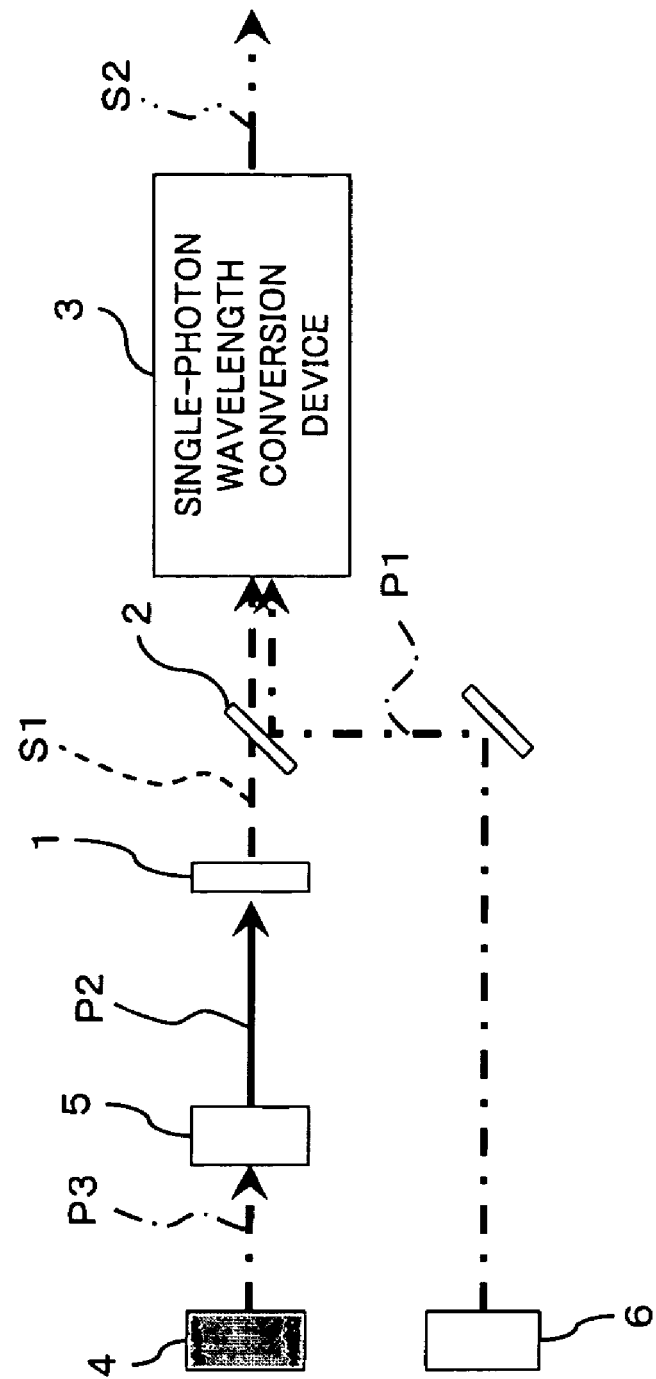
FIG. 1 shows a schematic diagram illustrating a single-photon generator according to one embodiment of the present invention.
Figure 2:
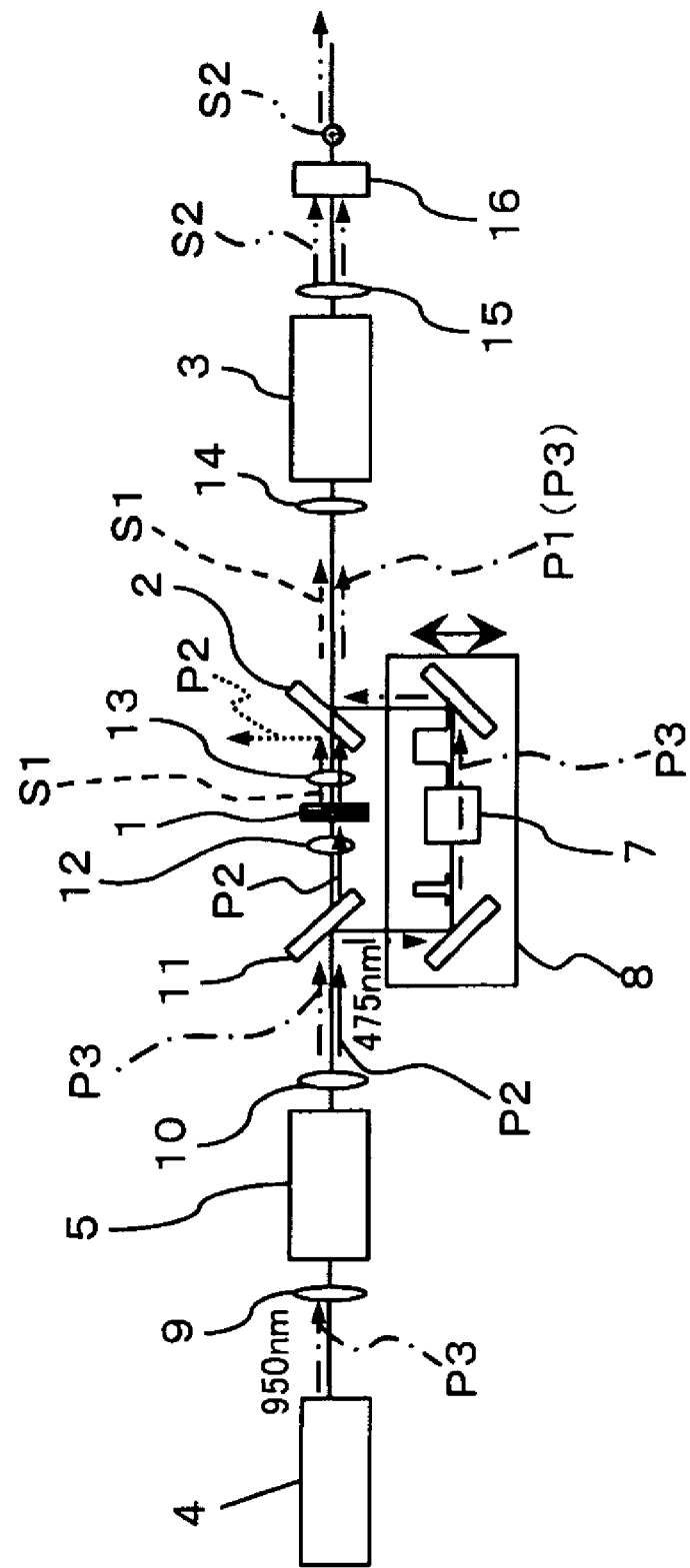
FIG. 2 shows a schematic diagram illustrating a single-photon generator according to one embodiment of the present invention.

Hereafter, a single-photon generator and a single-photon generation method according to the embodiments of the present invention are described referring to FIGS. 1 and 2.

As exemplarily shown in FIG. 1, according to the single-photon generator and the single-photon generation method in accordance with the present embodiment, a single-photon pulse S1 generated by a single-photon generating device 1 is multiplexed, by a multiplexer 2, with powerful pump pulse light P1 for single-photon wavelength conversion supplied from a pulse light source 6 for exciting a single-photon wavelength conversion device, and the single-photon pulse S1 and the pump pulse light P1 are made incident to a single-photon wavelength conversion device 3. Further, using nonlinear interaction inside the single-photon wavelength conversion device 3 having optical nonlinearity (that is, being formed of nonlinear optical material), the wavelength of the single-photon pulse S1 generated by the single-photon generating device 1 is converted into a longer wavelength side (frequency down-conversion). Thus, a single-photon pulse S2 of a communication wavelength band is generated.

With this, there is a merit that a single-photon of a communication wavelength band can be generated without causing an overall apparatus to become large in size.

The single-photon generator and the single-photon generation method thus configured can be used in, for example, quantum cryptography communication (quantum cryptograph, quantum communication) and a quantum information processing field in which a single-photon pulse is required.

Here, the single-photon generating device 1 uses a single-photon generating device capable of emitting light at room temperature (that is, operable at room temperature). As the single-photon generating device capable of emitting light at room temperature, for example, devices using a CdSe quantum dot, a single molecule such as terrylene, and a nitrogen-vacancy color center in a diamond crystal are considered. Such a single-photon generating device generates a single-photon pulse having a wavelength of a shorter wavelength side than the communication wavelength band.

As such, by performing frequency down-conversion of a single-photon pulse using a single-photon generating device capable of emitting light at room temperature (for example, a single-photon generating device having a CdSe quantum dot), it becomes possible to realize a single-photon generating device of a communication wavelength band capable of operating at room temperature, which has not been possible at all, compactly with a reduced cost.

According to the present embodiment, there is used a single-photon generating device 1 generating a single-photon pulse in a visible wavelength region at room temperature, for example, a device including a CdSe single quantum dot having an emission line in the vicinity of a wavelength of 590 nm.

As such, by performing frequency down-conversion of the single-photon pulse, it becomes possible to positively use a material having high emission efficiency in, for example, a single-photon generator of a visible wavelength region which has been considered inappropriate from the viewpoint of the transmission loss in an optical fiber. Thus, the single-photon generator of a communication wavelength band having high performance can be realized.

Additionally, although an optically pumped single-photon generating device 1 optically pumped by the pump pulse light P2 for single-photon generation is used in the present embodiment, it is not limited thereto, but, for example, an EL (electroluminescence) single-photon generating device may be used.

Further, according to the present embodiment, as shown in FIG. 1, there are provided a pulse light source 4 generating pulse light P3 of a fundamental wavelength (fundamental wave pulse light), and a pulse light wavelength converter (excitation wavelength converter) 5 performing wavelength conversion of the fundamental wave pulse light P3 generated by the pulse light source 4 into pump pulse light P2 for single-photon generation, having an optimal wavelength for exciting the single-photon generating device 1.

Now, when configuring as described above, it is necessary to prepare two excitation pulse light sources: a pulse light source 6, which generates pump pulse light P1 for single-photon wavelength conversion being made incident to the single-photon wavelength conversion device 3; and a pulse light source (here, pulse light source 4 and a pulse light wavelength converter 5; which are also referred to as pumping light generator) for exciting the single-photon generating device, which generates the pump pulse light P2 for single-photon generation so as to excite the single-photon generating device 1.

Also, in order to realize the single-photon generator configured as described above, because of use of two pulse light sources, an additional mechanism is required for performing synchronization (frequency synchronization) of the single-photon pulse S1 with the pump pulse light P1 for single-photon wavelength conversion.

Taking such a point into consideration, it is preferable to configure to realize the single-photon generator and the single-photon generation method in the following manner.

Namely, as shown in FIG. 2, it is preferable to configure such that the single-photon generator includes, as the single-photon wavelength conversion device 3, a single-photon wavelength conversion device formed of nonlinear optical material of a periodically-poled structure, and the single-photon pulse S1 generated by the single-photon generating device 1 is multiplexed, by the multiplexer 2, with the pump pulse light P1 for single-photon wavelength conversion, and the single-photon pulse S1 and the pump pulse light P1 are made incident to a single-photon wavelength conversion device 3, and further, using a difference frequency generation process (nonlinear interaction) inside the single-photon wavelength conversion device 3 formed of periodically-poled nonlinear optical material, the wavelength of the single-photon pulse S1 generated by the single-photon generating device 1 is converted into a longer wavelength side (frequency down-conversion), thereby generating a single-photon pulse S2 of the communication wavelength band.

Here, the single-photon wavelength conversion device 3 is configured to convert the wavelength of the single-photon pulse S1 to a wavelength corresponding to the difference frequency between the wavelength of the single-photon pulse S1 and the wavelength of the pump pulse light P1 for single-photon wavelength conversion. According to the present embodiment, the single-photon wavelength conversion device 3 is configured to perform wavelength conversion of the single-photon pulse S1 having a wavelength of a shorter wavelength side than the communication wavelength band into the single-photon pulse S2 of the communication wavelength.

Here, where the wavelength of the single-photon pulse S1 generated by the single-photon generating device 1 is $\lambda_1$, and the wavelength of the pump pulse light P1 for single-photon wavelength conversion is $\lambda_2$, the wavelength $\lambda_3$ of the single-photon pulse S2 after the conversion performed by the single-photon wavelength conversion device 3 is determined by the energy conservation law: $\lambda_3 \sim (\lambda_1^{-1} - \lambda_2^{-1})^{-1}$.

Therefore, by appropriately selecting the period of polarization reversal and the wavelength of the pump pulse light P1 for single-photon wavelength conversion so as to match the wavelength of the single-photon pulse S1 being made incident to the single-photon wavelength conversion device 3, the single-photon pulse S2 of the communication wavelength band can be obtained.

Here, the single-photon wavelength conversion device 3 is formed of periodically-poled nonlinear optical material which is designed to perform wavelength conversion of the single-photon pulse S1 having a wavelength of $\lambda_{signal}$ into the single-photon pulse S2 of the communication wavelength band (here, 1.55-μm band) by generating the difference frequency between the single-photon pulse S1 having the wavelength of $\lambda_{signal}$ and the fundamental wave pulse light (residual fundamental wave pulse light) P3 having a wavelength of $\lambda_{fund}$ as the pump pulse light P1 for single-photon wavelength conversion.

In particular, here, PPLN (periodically-poled Lithium Niobate; $LiNbO_3$), on which periodic polarization reversal is performed, is used as periodically-poled nonlinear optical material of the single-photon wavelength conversion device 3 so as to obtain sufficiently high wavelength conversion efficiency.

Additionally, although PPLN is used here as the above periodically-poled nonlinear optical material, it is not limited thereto, but an optical material having a large nonlinear coefficient, such as, for example, Potassium Titanyl Phosphate ($KTiOPO_4$) may be used. Also, it is possible to use a nonlinear crystal such as bulk Lithium Niobate ($LiNbO_3$) or LBO.

Also, as the pulse light wavelength converter 5, preferably, a wavelength conversion device formed of periodically-poled nonlinear optical material is used. Additionally, any nonlinear optical material may be used as the pulse light wavelength converter 5, and therefore not only the aforementioned Lithium Niobate ($LiNbO_3$), but an optical material having a large nonlinear coefficient such as Potassium Titanyl Phosphate ($KTiOPO_4$) may also be used. For example, as the pump pulse light P2 for single-photon generation, a second harmonic generating device generating the second harmonic of the fundamental wave pulse light P3 may be used. Additionally, it may also be possible to use a third harmonic generating device generating the third harmonic, depending on the necessity.

Also, as the pulse light source 4, in order to reduce the noise such as Raman scattering and stray light produced inside the wavelength conversion device formed of periodically-poled nonlinear optical material, it is preferable to use a device which generates short pulse light (fundamental wave of short pulse light) having a high peak value and a narrow temporal width.

According to the present embodiment, as the single-photon generating device 1, a device including a CdSe single quantum dot having an emission line in the vicinity of a wavelength of 590 nm is used. Accordingly, the pulse width of the fundamental wave pulse light P3 generated by the short pulse light source 4 is set sufficiently shorter (for example, the pulse width of the order of 100 fs-100 ps) than the recombination lifetime (for example, on the order of 1 ns) of the quantum dot.

As such, as each of the single-photon wavelength conversion device 3 and the pulse light wavelength converter 5, it is preferable to use a wavelength conversion device (single-photon wavelength conversion device, or pulse light wavelength conversion device) formed of periodically-poled nonlinear optical material. With this, the conversion efficiency can be increased.

Further, it is preferable to supply the fundamental wave pulse light P3 from the pulse light source 4 to the pulse light wavelength converter 5, and convert the wavelength thereof to a shorter wavelength side, so as to generate the pump pulse light P2 for single-photon generation for optically pumping the single-photon generating device 1, and also, to supply to the single-photon wavelength conversion device 3 the residual component of the fundamental wave (residual fundamental wave pulse light) P3 which remains without being converted into the pump pulse light P2 for single-photon generation by the pulse light wavelength converter 5, by bypassing the single-photon generating device 1, so as to reuse the residual fundamental wave pulse light P3 as the pump pulse light P1 for single-photon wavelength conversion, thereby converting the wavelength of the single-photon pulse S1 generated by the single-photon generating device 1 into a longer wavelength side (frequency down-conversion).

With this, since only one pulse light source (short pulse light source) 4 is used to generate the two kinds of pump pulse light, frequency synchronization can be obtained between the single-photon pulse S1 and the pump pulse light P1 (P3) for single-photon wavelength conversion, without additionally providing an electric circuit, etc. Also, by adopting such the configuration, it becomes possible to realize an overall apparatus in a compact size.

Accordingly, the rate of generation of the single-photon pulse S2 can be optimized only by simply adjusting timing and a pulse width by means of optically delaying the residual fundamental wave pulse light P3, or the like, as described later.

Now, because the emission lifetime of a typical quantum dot is on the order of 1 ns, the time at which the single-photon pulse S1 is emitted has uncertainty on the order of 1 ns.

Therefore, according to the present embodiment, a pulse stretcher 7 and an optical path length adjuster 8 are provided, as shown in FIG. 2. By optimizing a temporal overlap between the single-photon pulse S1 and the fundamental wave pulse light P3 functioning as the pump pulse light P1 for single-photon wavelength conversion, the wavelength conversion efficiency in the single-photon wavelength conversion device 3 is optimized.

Here, in order to compensate the uncertainty in the time of occurrence of the single-photon pulse S1 generated by the single-photon generating device 1, the pulse stretcher 7 is provided for stretching the pulse width of the residual fundamental wave pulse light P3 to the same order (approx. 1 ns) as the emission recombination lifetime of the quantum dot constituting the single-photon generating device 1. The above pulse stretcher 7 is configured of, for example, a grating, a prism, or the like.

Also, the optical path length adjuster 8 is provided so that the timing between the residual fundamental wave pulse light P3 functioning as the pump pulse light P1 for the single-photon wavelength conversion and the single-photon pulse S1 is matched. The above optical path length adjuster 8 functions as a time delay portion for temporally delaying the residual fundamental wave pulse light P3 against the single-photon pulse S1, so that the residual fundamental wave pulse light P3 stretched by the pulse stretcher 7 is temporally overlapped with the single-photon pulse S1. The optical path length adjuster 8 is, for example, a translation stage.

Next, referring to FIG. 2, a single-photon generation method using the present single-photon generator is described.

Hereafter, as the single-photon generating device 1, an exemplarily case of using the single-photon generating device including a CdSe single quantum dot having an emission line in the vicinity of a wavelength of 590 nm is described.

First, fundamental wave pulse light (short pulse light fundamental wave) P3 having a wavelength of $\lambda_{fund}$ output from the pulse light source (short pulse light source) 4 is collected by a collection lens 9 to be incident to the pulse light wavelength conversion device (excitation wavelength converter) 5.

Here, the temporal pulse width of the fundamental wave pulse light P3 generated by the short pulse light source 4 is set sufficiently shorter than the recombination lifetime (for example, on the order of 1 ns) of the quantum dot (for example, the pulse width of the order of 100 fs-100 ps).

Further, it is sufficient if the oscillation wavelength $\lambda_{fund}$ of the fundamental wave pulse light P3 generated by the short pulse light source 4 may satisfy the following conditions: (i) the wavelength $\lambda_{SHG}$ after converted by the pulse light wavelength conversion device 5 exists on the shorter wavelength side than the absorption band of the single-photon generating device 1; and (ii) the difference frequency between the wavelength $\lambda_{signal}$ of the single-photon pulse S1 generated by the single-photon generating device 1 (i.e. the emission wavelength of the single-photon generating device 1) and the wavelength of the residual fundamental wave pulse light P3 (the pump pulse light P1 for single-photon wavelength conversion) ranges within a communication wavelength band (here, 1.55-μm band) Here, as the short pulse light source 4, for example, a Titan-sapphire laser is used, and the oscillation wavelength $\lambda_{fund}$ of the fundamental wave pulse light P3 is set at 950 nm which can be oscillated by the above laser ($\lambda_{fund}$=950 nm).

The pulse light wavelength conversion device 5 performs wavelength conversion of the fundamental wave pulse light P3 having the wavelength of $\lambda_{fund}$, and outputs second harmonic pulse light P2 having a wavelength of $\lambda_{SHG}$, which is a frequency-doubled wave (a wave having twice as many as the frequency) of the fundamental wave pulse light P3 (namely, $\lambda_{SHG}=\lambda_{fund}/2=475$ nm). For the above reason, the pulse light wavelength conversion device 5 is also referred to as a second harmonic generating device. Further, residual fundamental wave pulse light (a residual component of the fundamental wave pulse light) P3 having remained without being wavelength-converted is also output from the pulse light wavelength conversion device 5.

Then, the second harmonic pulse light P2 and the residual fundamental wave pulse light P3 are collimated by a collimation lens 10. Thereafter, the residual fundamental wave pulse light P3 is selectively reflected by a dielectric mirror 11, and then guided to the pulse stretcher 7. Meanwhile, the second harmonic pulse light P2 transmits through the dielectric mirror 11, and then input to the single-photon generating device 1 via a collection lens 12, as pump pulse light (pump pulse light for single-photon generation).

By the second harmonic pulse light P2 being input as the pump pulse light and having the wavelength of $\lambda_{SHG}$, the CdSe quantum dot (a material capable of emitting light at room temperature) constituting the single-photon generating device 1 is excited, and the single-photon pulse S1 having a wavelength of $\lambda_{signal}$ ($\lambda_{signal}$=590 nm) is generated.

The single-photon pulse S1 having the wavelength of $\lambda_{signal}$ ($\lambda_{signal}$=590 nm) generated by the single-photon generating device 1 is collimated by a collimation lens 13. Thereafter, the collimated single-photon pulse S1 transmits through a WDM coupler (multiplexer) 2, which is then collected by a collection lens 14, and incident to the single-photon wavelength conversion device 3. Additionally, the second harmonic pulse light P2 having the wavelength of $\lambda_{SHG}$ output from the single-photon generating device 1 is selectively reflected by the WDM coupler 2 In the meantime, as to the residual fundamental wave pulse light P3 reflected by the dielectric mirror 11 and made to branch (divide), the temporal pulse width thereof is stretched by the pulse stretcher 7 (for example, grating) to the same order (approx. 1 ns) as the emission lifetime of the quantum dot constituting the single-photon generating device 1.

The residual fundamental wave pulse light P3 stretched by the pulse stretcher 7 is temporally delayed by the optical path length adjuster (time delay portion) 8, so that the timing is matched with the single-photon pulse S1, which is then selectively reflected by the WDM coupler 2 and multiplexed with the single-photon pulse S1 in a coaxial manner.

Here, the WDM coupler 2 is configured to function as high-reflection mirror to the fundamental wave pulse light P3 (pump pulse light P1 for single-photon wavelength conversion) having the wavelength of $\lambda_{fund}$ and the second harmonic pulse light (pump pulse light for single-photon generation) P2 having the wavelength of $\lambda_{SHG}$, and also to function as anti-reflection film to the single-photon pulse S1 having the wavelength of $\lambda_{signal}$. For example, a dielectric mirror having such the functions may be used.

As such, the residual fundamental wave pulse light P3, which is stretched by the pulse stretcher 7, of which timing is matched by the optical path length adjuster 8, and multiplexed with the single-photon pulse S1 in a coaxial manner, is collected by the collection lens 14 together with the single-photon pulse S1, and then made incident to the single-photon wavelength conversion device 3.

The single-photon wavelength conversion device 3 is formed of periodically-poled nonlinear optical material (here, PPLN) which is designed to perform wavelength conversion into the single-photon pulse S2 of the communication wavelength band (here, 1.55-μm band) by generating a difference frequency between the single-photon pulse S1 having the wavelength of $\lambda_{signal}$ and the fundamental wave pulse light P3 (the pump pulse light P1 for single-photon wavelength conversion) having the wavelength of $\lambda_{fund}$. Accordingly, using the difference frequency generated between the fundamental wave pulse light P3 having the wavelength of $\lambda_{fund}$ ($\lambda_{fund}$=950 nm) and the single-photon pulse S1 having the wavelength of $\lambda_{signal}$ ($\lambda_{signal}$=590 nm), the light incident to the single-photon generating device 1 is wavelength-converted into the single-photon pulse S2 of the communication wavelength band having a wavelength of $\lambda_{out}$ [$\lambda_{out}$=(590$^{-1}$−950$^{-1}$)$^{-1}$=1,557 nm].

The single-photon pulse S2 thus wavelength-converted is output via a collimation lens 15. Further, from the single-photon wavelength conversion device 3, the residual fundamental wave pulse light (residual component of the fundamental wave pulse light) P3 remained without being wavelength-converted is also output. The residual fundamental wave pulse light P3 is then removed by an optical filter 16, and the single-photon pulse S2 of the communication wavelength band (1.55-μm band) is extracted.

Thus, according to the single-photon generator and the single-photon generation method in accordance with the present embodiment, there is a merit that the single-photon pulse S2 of the communication wavelength band can be generated without causing the overall apparatus to become large in size.

Further, when reusing, in the single-photon wavelength converter 3, the residual component of the fundamental wave pulse light P3 not converted in the single-photon generating device 1, it is sufficient to provide only one pulse light source. Therefore, there is a merit that the overall apparatus can be configured compactly with a reduced cost. Moreover, since it is sufficient to provide only one pulse light source, frequency synchronization between each pulse can be performed without an additional electric circuit. Also, the conversion efficiency in the single-photon wavelength conversion device 3 becomes optimal, because the temporal overlap of the single-photon pulse S1 with the fundamental wave pulse light P3 (pump pulse light P1 for the single-photon wavelength conversion) is optimized by means of the pulse stretcher 7 and the optical path length adjuster 8.

Further, because of using the single-photon generating device 1 having the CdSe quantum dot, a material capable of emission at room temperature, the overall system can be operated at room temperature (here, the PPLN has a temperature adjustment mechanism such as a Peltier device). This makes a cooling agent such as liquid helium unnecessary, and accordingly, there is a merit that the single-photon pulse S2 of the communication wavelength band can be generated while miniaturizing the overall apparatus. In short, a single-photon generator of the communication wavelength band capable of operating at room temperature can be realized, which enables realization of practical quantum cryptography.

The present invention is not limited to the aforementioned embodiments. A variety of modifications may be possible without departing from the scope of the invention.

What is claimed is:

1. A single-photon generator comprising:
    a single-photon generating device generating a single-photon pulse having a wavelength of a shorter wavelength side than a communication wavelength band; and
    a single-photon wavelength conversion device performing wavelength conversion of the single-photon pulse into a single-photon pulse of the communication wavelength band using pump pulse light for single-photon wavelength conversion.

2. The single-photon generator according to claim 1, wherein the single-photon wavelength conversion device is configured to convert the single-photon pulse wavelength to a wavelength corresponding to a difference frequency between the single-photon pulse wavelength and the pump pulse light wavelength for single-photon wavelength conversion.

3. The single-photon generator according to claim 1, wherein the single-photon wavelength conversion device is formed of a periodically-poled nonlinear optical material.

4. The single-photon generator according to claim 1, wherein the single-photon generating device is a single-photon generating device capable of operating at a room temperature.

5. The single-photon generator according to claim 1, wherein the single-photon generating device is a single-photon generating device generating a single-photon pulse of a visible wavelength region.

6. The single-photon generator according to claim 1, further comprising:

a pulse light source generating pulse light of a fundamental wavelength; and a pulse light wavelength converter performing wavelength conversion of the pulse light of the fundamental wave generated by the pulse light source, and for generating pump pulse light for single-photon generation so as to excite the single-photon generating device, wherein the single-photon generating device is configured to generate the single-photon pulse, using the pump pulse light for single-photon generation being generated in the pulse light wavelength converter, and wherein residual fundamental wave pulse light having not been converted into the pump pulse light for single-photon generation in the pulse light wavelength converter is used as the pump pulse light for single-photon wavelength conversion.

7. The single-photon generator according to claim 6, wherein the pulse light wavelength converter is a pulse light wavelength conversion device formed of a nonlinear optical material.

8. The single-photon generator according to claim 6, wherein the pulse light wavelength converter is a second harmonic wave generating device generating a second harmonic wave of the fundamental wave pulse light as pump pulse light for single-photon generation.

9. The single-photon generator according to claim 6, further comprising:

an optical path length adjuster adjusting the optical path length of the residual fundamental wave pulse light so as to match the timing between the residual fundamental wave pulse light and the single-photon pulse.

10. The single-photon generator according to claim 6, further comprising:

a pulse stretcher stretching the pulse width of the residual fundamental wave pulse light so as to be on the same order as the emission lifetime of the single-photon generating device.

11. A single-photon generation method comprising:

generating a single-photon pulse having a wavelength of a shorter wavelength side than a communication wavelength band; and performing wavelength conversion of the single-photon pulse into a single-photon pulse of the communication wavelength band, using pump pulse light for single-photon wavelength conversion.

12. The single-photon generation method according to claim 11, wherein the single-photon pulse is generated by a single-photon generating device capable of operating at a room temperature.

* * * * *